United States Patent
Hamilton et al.

(10) Patent No.: US 11,288,102 B2
(45) Date of Patent: Mar. 29, 2022

(54) MODIFYING RESOURCES FOR COMPOSED SYSTEMS BASED ON RESOURCE MODELS

(71) Applicant: LENOVO ENTERPRISE SOLUTIONS (SINGAPORE) PTE. LTD., Singapore (SG)

(72) Inventors: Jeffrey R. Hamilton, Pittsboro, NC (US); James J. Parsonese, Cary, NC (US); Pravin Patel, Cary, NC (US)

(73) Assignee: LENOVO ENTERPRISE SOLUTIONS (SINGAPORE) PTE. LTD., Singapore (SG)

( * ) Notice: Subject to any disclaimer, the term of this patent is extended or adjusted under 35 U.S.C. 154(b) by 178 days.

(21) Appl. No.: 15/689,148

(22) Filed: Aug. 29, 2017

(65) Prior Publication Data

US 2019/0065256 A1    Feb. 28, 2019

(51) Int. Cl.
| | |
|---|---|
| G06F 9/50 | (2006.01) |
| H04L 29/08 | (2006.01) |
| G06F 15/173 | (2006.01) |
| H04L 67/1008 | (2022.01) |
| H04L 67/1031 | (2022.01) |
| H04L 67/1001 | (2022.01) |

(52) U.S. Cl.
CPC ............ *G06F 9/505* (2013.01); *G06F 9/5083* (2013.01); *H04L 67/1008* (2013.01); *H04L 67/1031* (2013.01); *G06F 15/173* (2013.01); *H04L 67/1002* (2013.01)

(58) Field of Classification Search
CPC ...... G06F 15/173; G06F 9/505; G06F 9/5083; H04L 67/1002; H04L 67/1008; H04L 67/1031
See application file for complete search history.

(56) References Cited

U.S. PATENT DOCUMENTS

| | | | |
|---|---|---|---|
| 7,603,443 B2 * | 10/2009 | Fong | G06F 9/44505 709/220 |
| 9,176,762 B2 * | 11/2015 | Deshpande | G06F 9/5011 |
| 10,152,357 B1 * | 12/2018 | Espy | G06F 9/505 |
| 10,564,987 B1 * | 2/2020 | Lepine | G06F 8/65 |
| 2004/0181476 A1 * | 9/2004 | Smith | G06Q 40/00 705/35 |
| 2005/0028160 A1 * | 2/2005 | Cofer | G06F 9/4881 718/100 |
| 2005/0268063 A1 * | 12/2005 | Diao | G06F 9/5083 711/170 |

(Continued)

*Primary Examiner* — Jorge A Chu Joy-Davila (57) ABSTRACT

Modifying resources for composed systems based on resource models including receiving a workload for execution on a composed system; extracting workload characteristics from the workload; matching the workload characteristics to a resource model, wherein the resource model comprises an initial configuration of compute elements for the composed system and a configuration modification to the initial configuration of the compute elements as the workload executes; composing the composed system using the initial configuration of compute elements described by the resource model, wherein the composed system comprises a subset of compute elements from a resource pool of compute elements; and executing, based on the resource model, the workload using the composed system, including modifying the initial configuration of the compute elements according to the resource model.

17 Claims, 6 Drawing Sheets

(56) References Cited

U.S. PATENT DOCUMENTS

| | | | | |
|---|---|---|---|---|
| 2010/0011366 A1* | 1/2010 | Gerovac | ............... | G06F 16/284 |
| | | | | 718/104 |
| 2012/0079497 A1* | 3/2012 | Gangemi | .............. | G06F 9/5011 |
| | | | | 718/104 |
| 2013/0179390 A1* | 7/2013 | Arnold | .................... | G06N 5/02 |
| | | | | 706/48 |
| 2014/0040908 A1* | 2/2014 | Doi | ........................ | G06F 8/451 |
| | | | | 718/104 |
| 2014/0334301 A1* | 11/2014 | Billaud | .................. | H04L 47/52 |
| | | | | 370/230.1 |
| 2015/0012634 A1* | 1/2015 | Zhu | ...................... | H04L 67/303 |
| | | | | 709/223 |
| 2015/0277980 A1* | 10/2015 | Ovsiankin | ............. | G06F 9/5066 |
| | | | | 718/104 |
| 2016/0269228 A1* | 9/2016 | Franke | ................. | H04L 41/083 |
| 2016/0285732 A1* | 9/2016 | Brech | ................... | G06F 9/5038 |
| 2017/0123855 A1* | 5/2017 | Li | ........................ | G06F 9/5055 |
| 2018/0113742 A1* | 4/2018 | Chung | .................. | G06F 9/5005 |

* cited by examiner

MODIFYING RESOURCES FOR COMPOSED SYSTEMS BASED ON RESOURCE MODELS

BACKGROUND

Field of the Invention

The field of the invention is data processing, or, more specifically, methods, apparatus, and products for modifying resources for composed systems based on resource models.

Description of Related Art

In cloud computing environments, data centers may be required to process a variety of different workloads on the available computing hardware. Dedicating more resources than necessary may result in inefficient utilization of the available resources. Similarly, dedicating fewer resources than necessary may result in over-utilization of the available resources. It is advantageous to select an amount of resources for each workload to maximize efficiency or other data center goals.

SUMMARY

Methods, systems, and apparatus for modifying resources for composed systems based on resource models are disclosed in this specification. Modifying resources for composed systems based on resource models includes receiving a workload for execution on a composed system; extracting workload characteristics from the workload; matching the workload characteristics to a resource model, wherein the resource model comprises an initial configuration of compute elements for the composed system and a configuration modification to the initial configuration of the compute elements as the workload executes; composing the composed system using the initial configuration of compute elements described by the resource model, wherein the composed system comprises a subset of compute elements from a resource pool of compute elements; and executing, based on the resource model, the workload using the composed system, including modifying the initial configuration of the compute elements according to the resource model.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION

Figure 1:
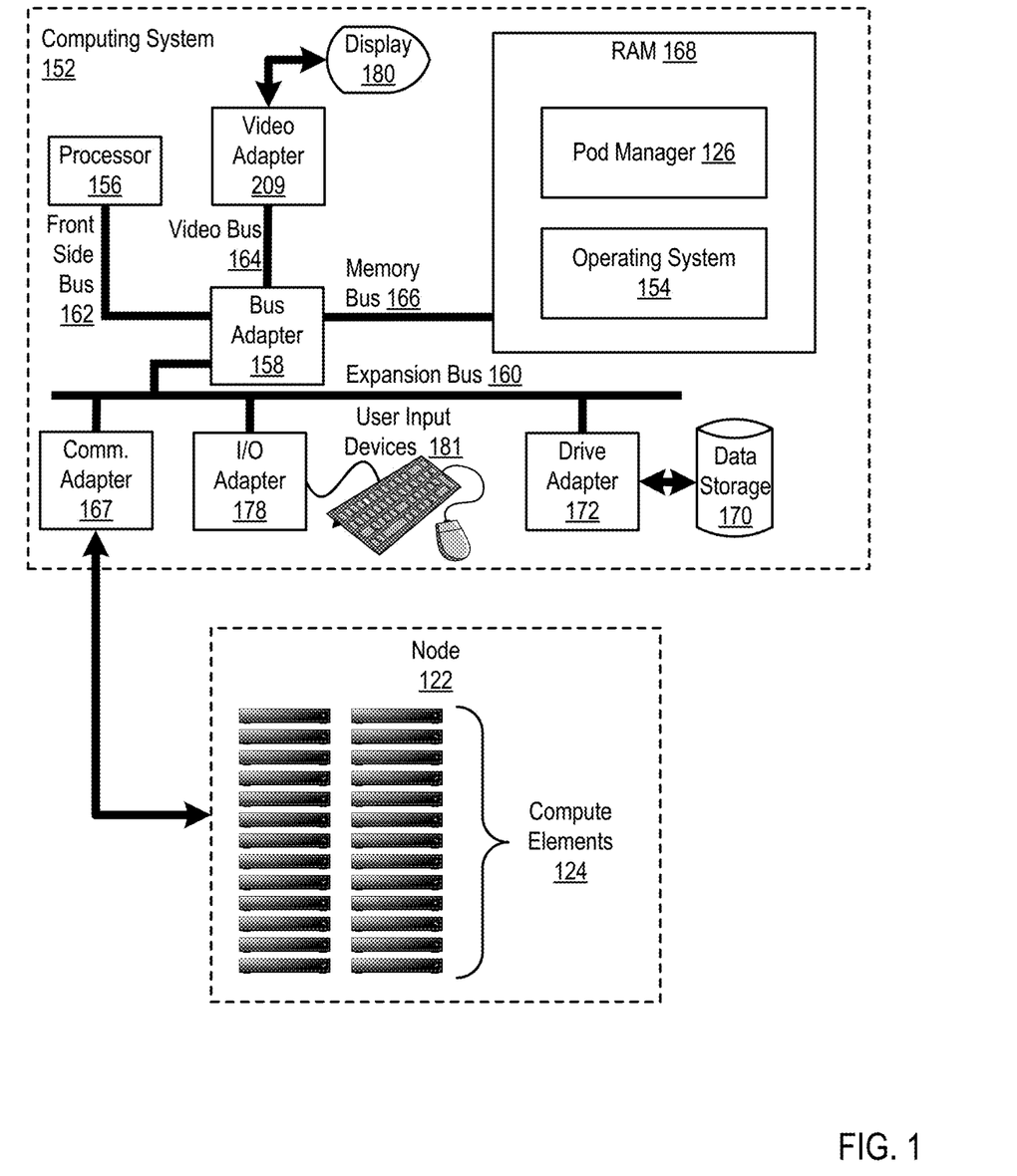
FIG. 1 sets forth a block diagram of an example system configured for modifying resources for composed systems based on resource models according to embodiments of the present invention.

Exemplary methods, apparatus, and products for modifying resources for composed systems based on resource models in accordance with the present invention are described with reference to the accompanying drawings, beginning with FIG. 1. FIG. 1 sets forth a block diagram of automated computing machinery comprising an exemplary computing system (152) configured for modifying resources for composed systems based on resource models according to embodiments of the present invention. The computing system (152) of FIG. 1 includes at least one computer processor (156) or 'CPU' as well as random access memory (168) ('RAM') which is connected through a high speed memory bus (166) and bus adapter (158) to processor (156) and to other components of the computing system (152).

Stored in RAM (168) is an operating system (154). Operating systems useful in computers configured for modifying resources for composed systems based on resource models according to embodiments of the present invention include UNIX™, Linux™, Microsoft Windows™, AIX™, and others as will occur to those of skill in the art. The operating system (154) in the example of FIG. 1 is shown in RAM (168), but many components of such software typically are stored in non-volatile memory also, such as, for example, on a disk drive (170). Also stored in RAM (168) and part of the operating system is a pod manager (126), a module of computer program instructions for modifying resources for composed systems based on resource models.

The computing system (152) of FIG. 1 includes disk drive adapter (172) coupled through expansion bus (160) and bus adapter (158) to processor (156) and other components of the computing system (152). Disk drive adapter (172) connects non-volatile data storage to the computing system (152) in the form of disk drive (170). Disk drive adapters useful in computers configured for modifying resources for composed systems based on resource models according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computing system (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computing system (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary computing system (152) of FIG. 1 includes a communications adapter (167) for data communications with other computers (182) and for data communications with a data communications network. Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful in computers configured for modifying resources for composed systems based on resource models according to embodiments of the present invention include modems for wired dial-up communications, Ethernet (IEEE 802.3) adapters for wired data communications, and 802.11 adapters for wireless data communications.

The communications adapter (167) of the exemplary computing system (152) of FIG. 1 is connected to a node (122) via a communications bus. The node (122) is a collection of compute elements (124) able to be arranged (i.e., composed) into different configurations based on the data center requirements. The compute elements (124) are modules of computer hardware and software used to create composed systems. Examples of compute elements (124) include processing units, memory, communications adapters, I/O adapters, drive adapters, and storage devices such as platter drives and solid state drives. The node (122) may be a set of computing elements configured based on the Rack Scale Design platform. Further, the node (122) may be directly coupled to the expansion bus (160), without utilizing a communications adapter (167).

Figure 2:
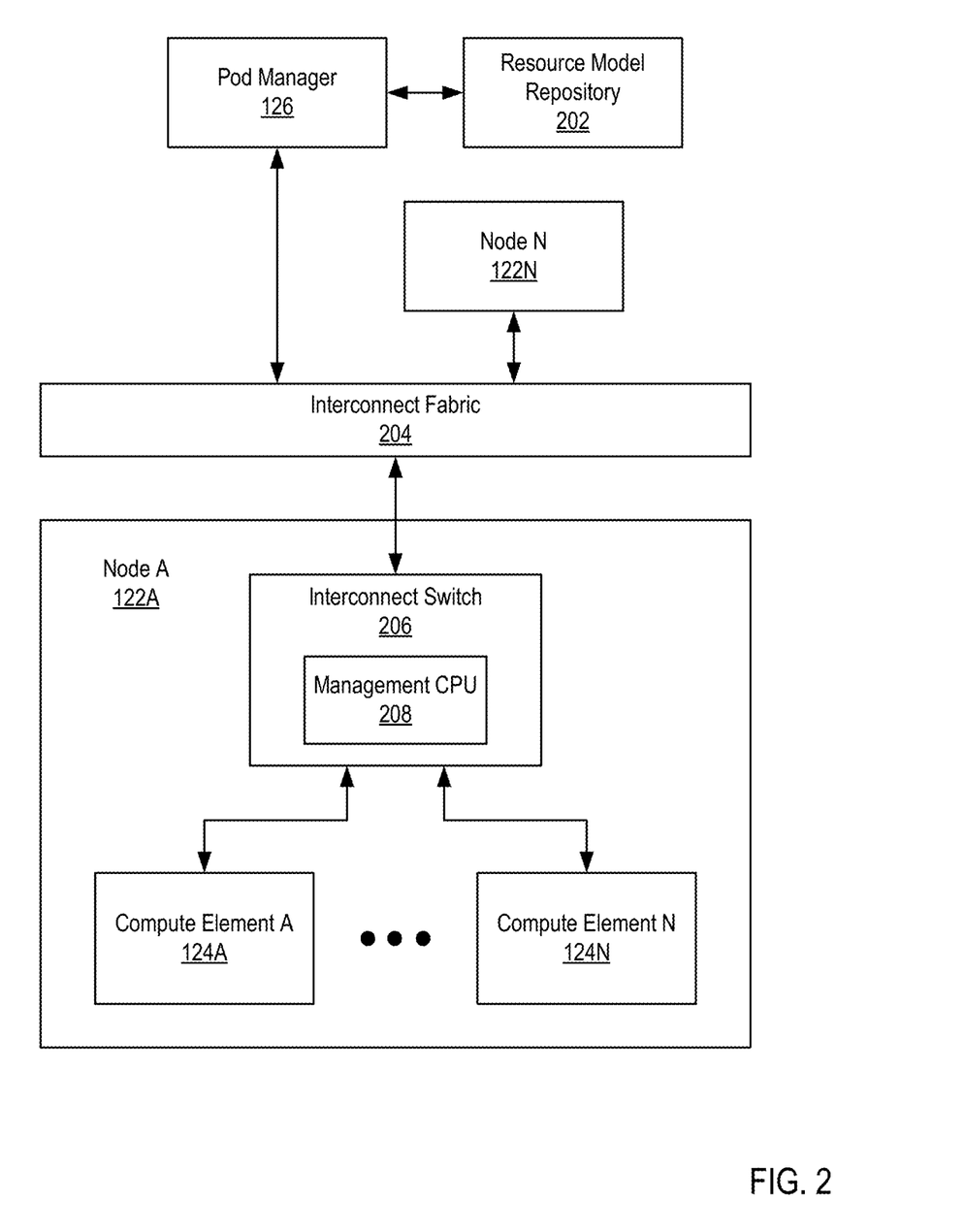
FIG. 2 sets forth a block diagram for modifying resources for composed systems based on resource models according to embodiments of the present invention.

FIG. 2 is an example block diagram of a system configured for modifying resources for composed systems based on resource models. FIG. 2 includes a pod manager (126) coupled to a resource model repository (202) and an interconnected fabric (204). Also, coupled to the interconnect fabric (204) are multiple nodes (node A (122A), node N (122N)). Node A (122A) includes an interconnect switch (206) coupled to the interconnect fabric (204) and multiple compute elements (compute element A (124A), compute element N (124N)). The interconnect switch (206) includes a management central processing unit (CPU) (208). Node N (122N) may include similar elements as those shown in Node A (122A).

A composed system is a collection of compute elements (compute element A (124A), compute element N (124N)) communicatively coupled together (i.e., composed) to form a computing system capable of executing a workload. A composed system may include, for example, compute elements such as a processor, memory, storage, and an input/output controller, each coupled to one another using an interconnect fabric (204). A composed system may include compute elements (compute element A (124A), compute element N (124N)) from different nodes (node A (122A), node N (122N)).

The pod manager (126) is software, hardware, or an aggregation of both software and hardware that composes and manages composed systems. A pod is a group of nodes (node A (122A), node N (122N)) housing compute elements (compute element A (124A), compute element N (124N)) used to create composed systems. The pod manager (126) manages and configures composed systems made up of compute elements (compute element A (124A), compute element N (124N)) on the nodes (node A (122A), node N (122N)). The pod manager (126) may instruct the management CPU (208) to add or remove a communications link on the interconnect fabric (204) between compute elements (compute element A (124A), compute element N (124N)) to create or modify a composed system.

The pod manager (126) may compose or modify a composed system based on a resource model. A resource model is a collection of instructions that includes an initial configuration of compute elements for a composed system and configuration modifications to the initial configuration of compute elements as the workload executes. Each resource model may also include trigger points which describe a resource utilization state at which modifications are to be made to the composed system.

Each resource model may be associated with workload characteristics including application characteristics and data characteristics. Specifically, each resource model may be keyed to (i.e., associated with) a collection of application characteristics and data characteristics such that for a given set of application characteristics and data characteristics, a similar or matching set of application characteristics and data characteristics keyed to one or more resource models may exist. Resource models may be stored in the resource model repository (202).

Resource models may be generated by the pod manager (126) or other modules on the system based on machine learning. Specifically, the resource models may be generated by the pod manager (126) or other modules on the system using historical utilization records of previously executed workloads. The utilization records may be analyzed to determine inefficiencies in the composed systems used to execute the workloads. The resource model may be generated with a proposed optimal combination of compute elements keyed to the characteristics of the workload.

The interconnect fabric (204) is a device or group of devices that transfers data between compute elements (compute element A (124A), compute element N (124N)) and nodes on the system. The interconnect fabric (204) may be a switching fabric such as a Peripheral Component Interconnect Express (PCIe), Infiniband, Omni-Path, or Ethernet network. The interconnect fabric (204) connects to nodes (node A (122A), node N (122N)) via an interconnect switch (206). The interconnect switch (206) is a bridge between the compute elements (compute element A (124A), compute element N (124N)) on the node and the interconnect fabric (204), creating a potential communicative coupling between each compute element (compute element A (124A), compute element N (124N)) on each node (node A (122A), node N (122N)) in the system. Each node (node A (122A), node N (122N)) is a collection of compute elements (compute element A (124A), compute element N (124N)) coupled together via an interconnect switch (206).

The management CPU (208) is software, hardware, or an aggregation of both software and hardware that manages and configures the compute elements (compute element A (124A), compute element N (124N)) on the node. The management CPU (208) communicates with the pod manager (126) to provide the pod manager (126) with information about the compute elements (compute element A (124A), compute element N (124N)) contained within the nodes (node A (122A), node N (122N)). The management CPU (208) also carries out the instructions received from the pod manager (126), including configuring the composition of the composed systems from the compute elements (compute element A (124A), compute element N (124N)) (e.g., by mapping or unmapping compute elements to or from other compute elements).

The management CPU (208) may also monitor the resource utilization of each compute element (compute element A (124A), compute element N (124N)) coupled to the interconnect switch (206). The management CPU (208) may send information about the resource utilization to the pod manager (126). Resource utilization information may include, for example, percentage utilized (e.g., percentage of processor utilization, percentage of storage or memory utilized, etc.), compute element temperature, and input/output generated to and from the compute element.

The compute elements (compute element A (124A), compute element N (124N)) are modules of computer hardware and software used to create composed systems. The compute elements (compute element A (124A), compute element N (124N)) may be endpoints on the interconnect fabric (204). Compute elements (compute element A (124A), compute element N (124N)) may include hardware compute elements such as processors, accelerators, memory, storage, and input/output adapters. Compute elements (compute element A (124A), compute element N (124N)) may also include software compute elements, such as virtualized hardware instantiated to share a single hardware compute element across multiple composed systems.

The compute elements (compute element A (124A), compute element N (124N)) from each node (node A (122A), node N (122N)) make up a resource pool. The resource pool of compute elements is the collection of each compute element (compute element A (124A), compute element N (124N)) from each node (node A (122A), node N (122N)). Each composed system may be composed from a subset of the compute elements (compute element A (124A), compute element N (124N)) in the resource pool.

Figure 3:
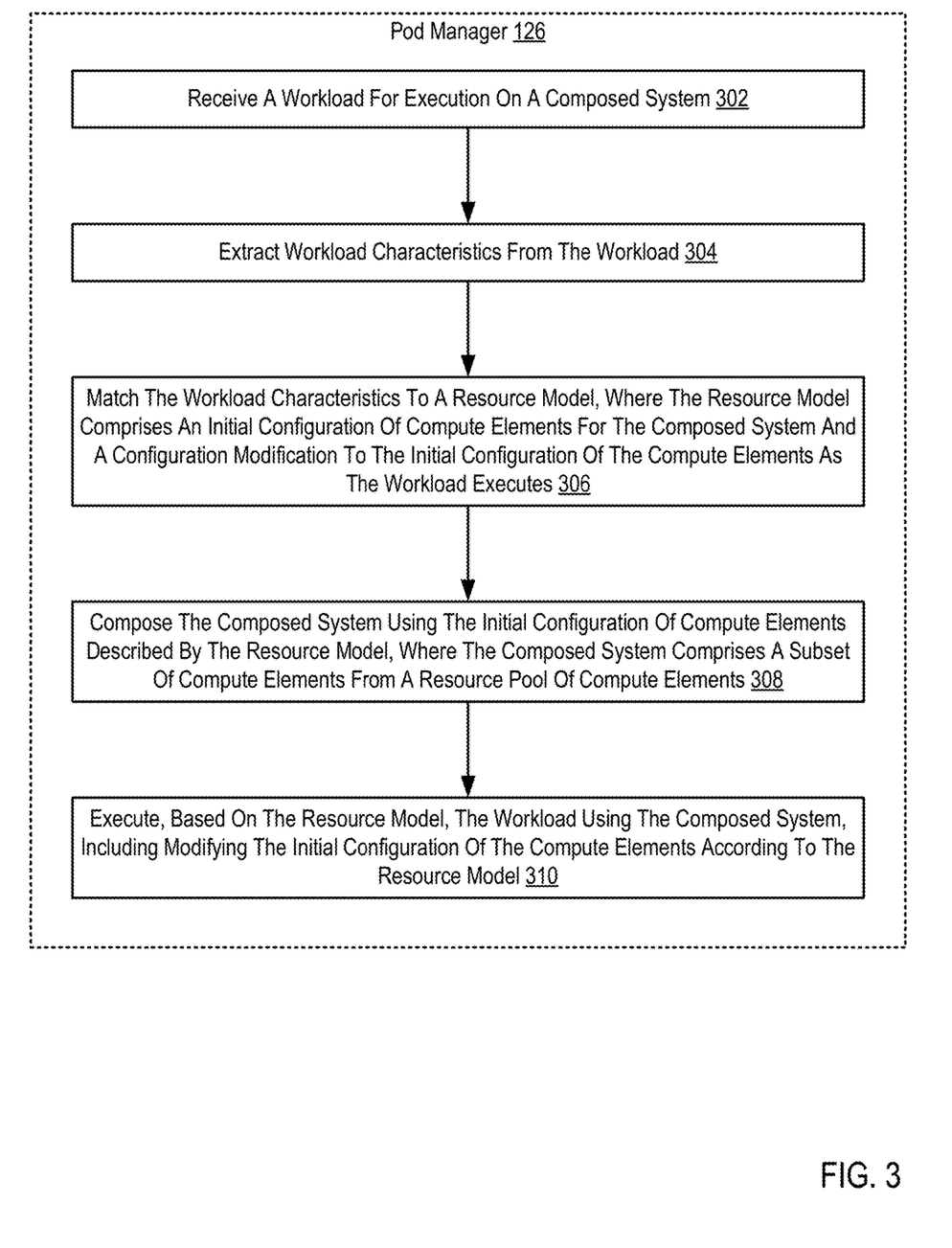
FIG. 3 sets forth a flow chart illustrating an exemplary method for modifying resources for composed systems based on resource models according to embodiments of the present invention.

For further explanation, FIG. 3 sets forth a flow chart illustrating an exemplary method for modifying resources for composed systems based on resource models according to embodiments of the present invention that includes receiving (302) a workload for execution on a composed system. Receiving (302) a workload for execution on a composed system may be carried out by the pod manager (126) receiving the workload or reference to the workload. A workload is a processing job that includes data and an application in which the data is processed according to the application. For example, a workload may model complex systems, such as weather forecasting using a weather modeling application and weather data.

The method of FIG. 3 further includes extracting (304) workload characteristics from the workload. Extracting (304) workload characteristics from the workload may be carried out by analyzing the workload to measure aspects of the workload and test the workload for the existence of types of data or functions that may affect the execution of the workload. The workload characteristics are metrics of the workload that indicate a configuration of compute elements in a composed system. The characteristics may include metadata describing the data and application of the workload. The characteristics may indicate an amount and type of computing resources required to execute the workload under given conditions (e.g., a set amount of time).

Workload characteristics may include, for example, an amount of data to be processed, an amount of accuracy required by the workload application, an amount of processing required by the workload application, and a type of functions employed by the workload application. Workload characteristics may also include, for example, a specific type of workload application, such as a weather modeling application and a specific type of workload data, such as weather data for Flagstaff, Ariz.

The method of FIG. 3 further includes matching (306) the workload characteristics to a resource model, wherein the resource model comprises an initial configuration of compute elements for the composed system and a configuration modification to the initial configuration of the compute elements as the workload executes. Matching (306) the workload characteristics to a resource model, wherein the resource model comprises an initial configuration of compute elements for the composed system and a configuration modification to the initial configuration of the compute elements as the workload executes may be carried out by selecting the resource model based on comparing the workload characteristics to a plurality of resource model workload characteristics.

The resource model is a collection of instructions that includes an initial configuration of compute elements for a composed system and configuration modifications to the initial configuration of compute elements as the workload executes. Specifically, the resource model may include a configuration of a composed system, at different execution points, upon which to execute the workload. The configuration may further certain data center goals, such as to maximize efficiency of resources or energy, or to reduce the time required to execute the workload.

Matching (306) the workload characteristics to a resource model may also include dynamically generating a resource model based on the workload characteristics. The pod manager (126) may generate a resource model based on the compute elements necessary to execute the workload according to the workload characteristics and data center goals.

The method of FIG. 3 further includes composing (308) the composed system using the initial configuration of compute elements described by the resource model, wherein the composed system comprises a subset of compute elements from a resource pool of compute elements. Composing (308) the composed system using the initial configuration of compute elements described by the resource model, wherein the composed system comprises a subset of compute elements from a resource pool of compute elements may be carried out by selecting compute elements that satisfy the requirements of the initial configuration of compute elements described by the resource model. The pod manager (126) may obtain an inventory of available compute elements and select the compute elements that satisfy or closely satisfy the initial configuration of compute elements. The pod manager (126) may select compute elements that are local (i.e., physically proximate) to each other over compute elements that are remote to each other. The subset of compute elements may be compute elements from different nodes.

Composing (308) the composed system using the initial configuration of compute elements described by the resource model may also be carried out by adding communications links on the interconnect fabric between compute element that make up the initial configuration of compute elements. Adding a communications link on the interconnect fabric may be carried out by instructing one or more management CPUs to create a communication coupling between compute elements. Adding a communications link on the interconnect fabric may also be carried out by creating a mapping between compute elements such that messages sent from one compute element are received by the intended recipient compute element.

The method of FIG. 3 further includes executing (310), based on the resource model, the workload using the composed system, including modifying the initial configuration of the compute elements according to the resource model. Executing (310), based on the resource model, the workload using the composed system may be carried out by providing the workload to the composed system and initiating the execution of the workload on the composed system.

Executing (310), based on the resource model, the workload using the composed system, including modifying the initial configuration of the compute elements according to the resource model may also be carried out by removing, during the execution of the workload, a communications link on an interconnect fabric between at least two of the subset of compute elements. Executing (310), based on the resource model, the workload using the composed system, including modifying the initial configuration of the compute elements according to the resource model may also be carried out by adding, during the execution of the workload, a communications link on an interconnect fabric between an additional compute element and the subset of compute elements.

Although the steps described above are shown as performed by the pod manager (126), the steps may be performed by another module within the pod manger (126) or communicatively coupled to the pod manager (126) and/or the communications fabric.

Figure 4:
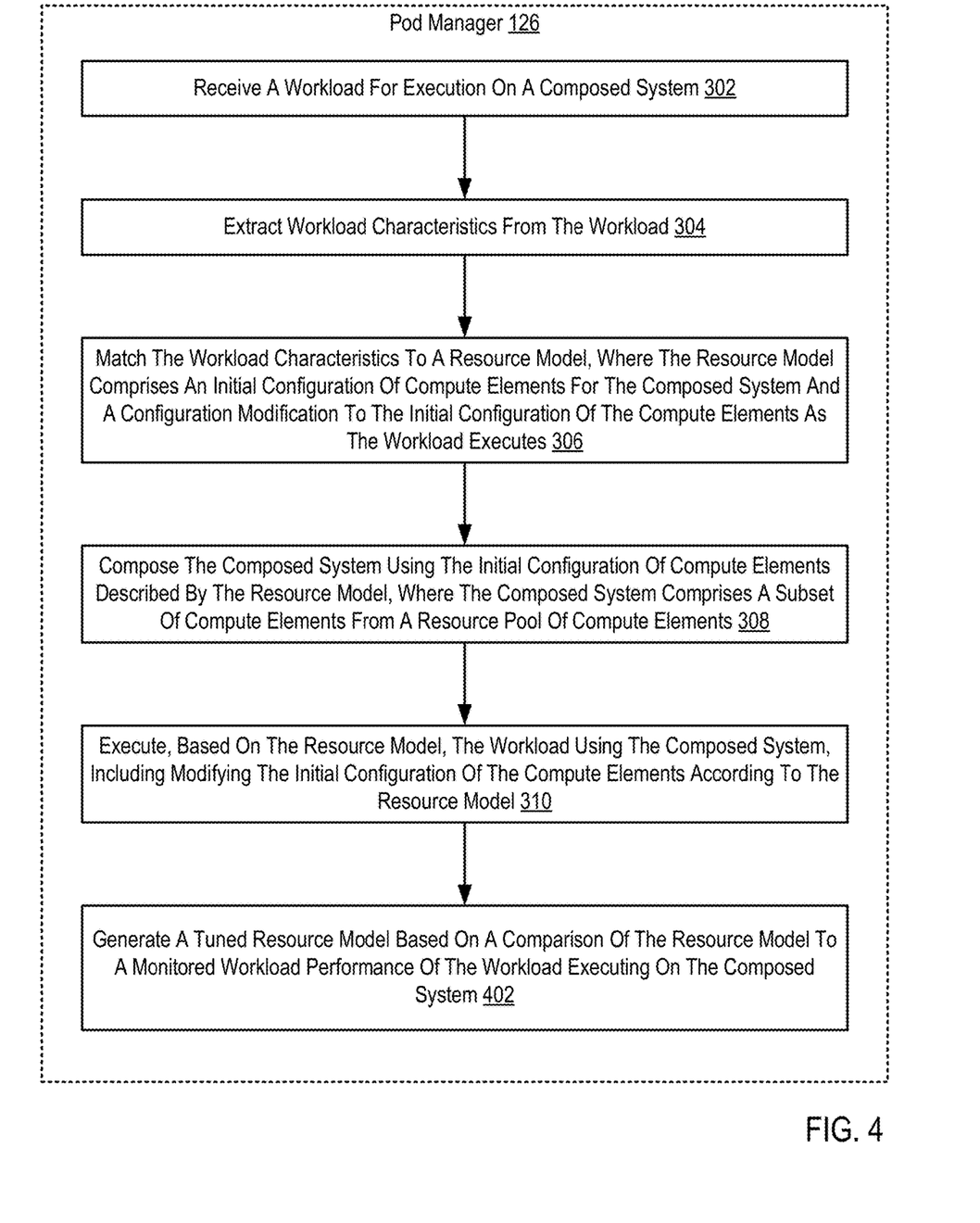
FIG. 4 sets forth a flow chart illustrating an exemplary method for modifying resources for composed systems based on resource models according to embodiments of the present invention.

For further explanation, FIG. 4 sets forth a flow chart illustrating a further exemplary method for modifying resources for composed systems based on resource models according to embodiments of the present invention that includes receiving (302) a workload for execution on a composed system; extracting (304) workload characteristics from the workload; matching (306) the workload characteristics to a resource model, wherein the resource model comprises an initial configuration of compute elements for the composed system and a configuration modification to the initial configuration of the compute elements as the workload executes; composing (308) the composed system using the initial configuration of compute elements described by the resource model, wherein the composed system comprises a subset of compute elements from a resource pool of compute elements; and executing (310), based on the resource model, the workload using the composed system, including modifying the initial configuration of the compute elements according to the resource model.

The method of FIG. 4 differs from the method of FIG. 3, however, in that the method of FIG. 4 further includes generating (402) a tuned resource model based on a comparison of the resource model to a monitored workload performance of the workload executing on the composed system. Generating (402) a tuned resource model based on a comparison of the resource model to a monitored workload performance of the workload executing on the composed system may be carried out by generating a utilization record during the execution of the workload on the composed system. The pod manager (126) may compare the utilization record to an expected utilization record for the resource model used to execute the workload. If the utilization record differs from the expected utilization record by a threshold amount, the resource model may be altered (i.e., tuned). The tuned resource model may be added as a new resource model to the resource model repository, or the tuned resource model may replace the existing resource model in the resource model repository.

For example, a workload for a weather simulation of Tucson, Ariz. may be matched to a resource model for weather simulations in Arizona that describes an initial configuration of a processor and memory, and a configuration modification of adding an accelerator when the processor reaches 90% utilization. The expected resource record may indicate that once the accelerator is added, the accelerator maintains 80% utilization for the remainder of the execution of similar workloads. During the execution of the workload simulating Tucson, Ariz., the utilization record may indicate that once the accelerator is added, the processor utilization drops below 60% and the accelerator maintains 10% utilization. The pod manager (126) may determine that a tuned resource model should be generated that does not modify the configuration by adding the accelerator. The tuned resource model for simulations in Tucson may be stored in the resource model repository in addition to the resource model for weather simulations in Arizona. The tuned resource model may also be keyed to the workload characteristics of the workload simulating weather specific to Tucson, Ariz. Alternatively, the tuned resource model may replace the current resource model and may be generated as a more robust resource model for weather simulations in Arizona.

Generating (402) a tuned resource model based on a comparison of the resource model to a monitored workload performance of the workload executing on the composed system may also be carried out by analyzing the resource model to determine the trigger points at which compute elements are added or removed to anticipate the need or availability of those compute elements for use with other workloads. By anticipating the need or availability of the compute elements, the pod manager (126) may get an accurate assessment of the compute elements available in the resource pool. For example, an accelerator may be assigned to a first workload during the first half of the execution of that workload, and then assigned to a second workload before the first workload finishes execution.

Figure 5:
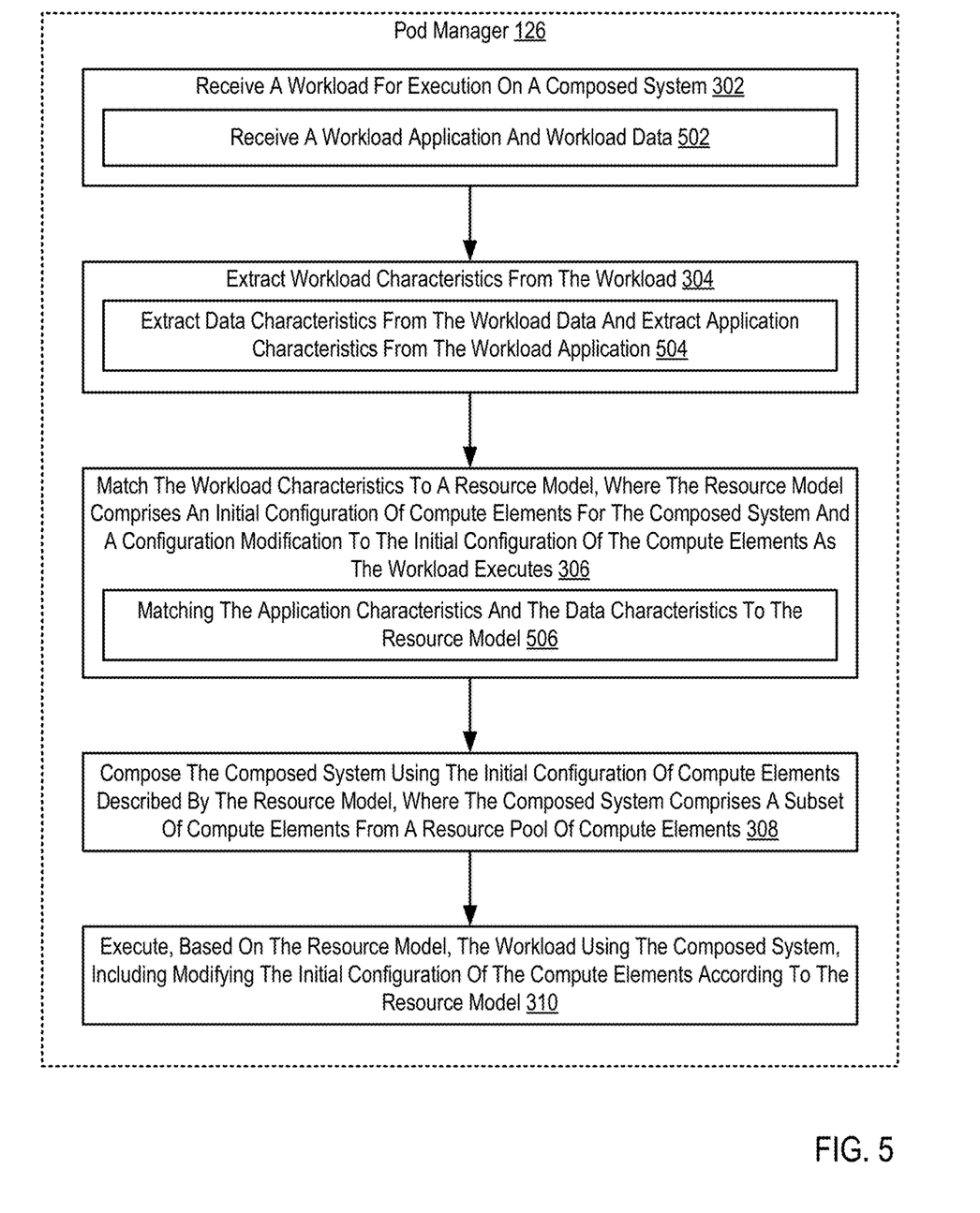
FIG. 5 sets forth a flow chart illustrating an exemplary method for modifying resources for composed systems based on resource models according to embodiments of the present invention.

For further explanation, FIG. 5 sets forth a flow chart illustrating a further exemplary method for modifying resources for composed systems based on resource models according to embodiments of the present invention that includes receiving (302) a workload for execution on a composed system; extracting (304) workload characteristics from the workload; matching (306) the workload characteristics to a resource model, wherein the resource model comprises an initial configuration of compute elements for the composed system and a configuration modification to the initial configuration of the compute elements as the workload executes; composing (308) the composed system using the initial configuration of compute elements described by the resource model, wherein the composed system comprises a subset of compute elements from a resource pool of compute elements; and executing (310), based on the resource model, the workload using the composed system, including modifying the initial configuration of the compute elements according to the resource model.

The method of FIG. 5 differs from the method of FIG. 3, however, in that receiving (302) a workload for execution on a composed system includes receiving (502) a workload application and workload data. Receiving (502) a workload application and workload data may be carried out by the pod manager (126) receiving, from a user interface, a reference to the workload application and a reference to the workload data to be processed by the workload application. For example, the pod manager (126) may receive, via a user interface, a reference to a weather modeling application and data describing weather measurements for Scottsdale, Ariz. during January of 2014.

The method of FIG. 5 also differs from the method of FIG. 3, in that extracting (304) workload characteristics from the workload includes extracting (504) data characteristics from the workload data and extracting application characteristics from the workload application. Extracting (504) data characteristics from the workload data may be carried out by analyzing the workload data to measure aspects of the workload data.

Data characteristics of the workload data may include general characteristics such as, for example, the amount of workload data to be processed, the level of accuracy of the data points, and the format of the workload data. Data characteristics of the workload data may also include specific characteristics such as, for example, the subject matter associated with the workload data (e.g., gene sequencing, weather modeling) and the source of the workload data (e.g., human genome, weather in Sedona, Ariz.).

Extracting application characteristics from the workload application may be carried out by analyzing the workload application to measure aspects of the workload application. Application characteristics of the workload application may include general characteristics such as, for example, the size (i.e., amount code) of the workload application, the types of functions employed by the workload application, the expected amount of output data, and the format of the workload application. Application characteristics of the workload application may also include specific characteristics such as, for example, the subject matter associated with the workload application (e.g., gene sequencing, weather modeling) and the name of the workload application.

The method of FIG. 5 also differs from the method of FIG. 3 in that matching (306) the workload characteristics to a resource model, wherein the resource model comprises an initial configuration of compute elements for the composed system and a configuration modification to the initial configuration of the compute elements as the workload executes includes matching (506) the application characteristics and the data characteristics to the resource model. Matching (506) the application characteristics and the data characteristics to the resource model may be carried out by comparing the application characteristics and data characteristics to application characteristics and data characteristics keyed to resource models in the resource model repository. The comparison may be a weighted comparison in which certain workload characteristic similarities are prioritized for matching purposes over others. A weighted comparison may be used if after a number of workload executions, the pod manager (126) determines that certain characteristics are more predictive of resource utilization than others.

For example, assume that the resource model repository includes two resource models—resource model A and resource model B. Resource model A is keyed to workload application characteristics that include a subject matter of gene sequencing, using complex functions, with an expected output of 2.2 terabytes. Resource model A is also keyed to workload data characteristics that include a rat genome, a data set of 700 gigabytes, and a mean data point size of 22 digits. Resource model B is keyed to workload application characteristics that include a subject matter of weather simulation, using simple functions, with an expected output of 5.7 terabytes. Resource model B is also keyed to workload data characteristics that include data from Phoenix, Ariz., a data set of 185 gigabytes, and a mean data point size of 16 digits.

Continuing with the example, assume a workload is received that sequences a human genome. The workload application is a gene sequencing application that uses simple functions, with an expected output of 5.5 terabytes. The workload data is a human genome with a data set of 198 gigabytes, and a mean data point size of 14 digits.

The pod manager (126) may compare the workload characteristics of the human genome sequencing workload to the workload characteristics for resource model A and resource model B. Assuming that each characteristic is given equal weight, the pod manager (126) may match the human genome sequencing workload to resource model B because the application characteristics of simple functions and expected output size, and the data characteristics of data set size and mean data point size, are more similar. However, if the pod manager (126) uses a weighted comparison that gives priority to similarities in subject matter, then resource model A may be selected because using a genome sequencing application to sequence a rat genome is more computationally similar to using a genome sequencing application to sequence a human genome, regardless of the other application characteristic and data characteristic similarities.

Figure 6:
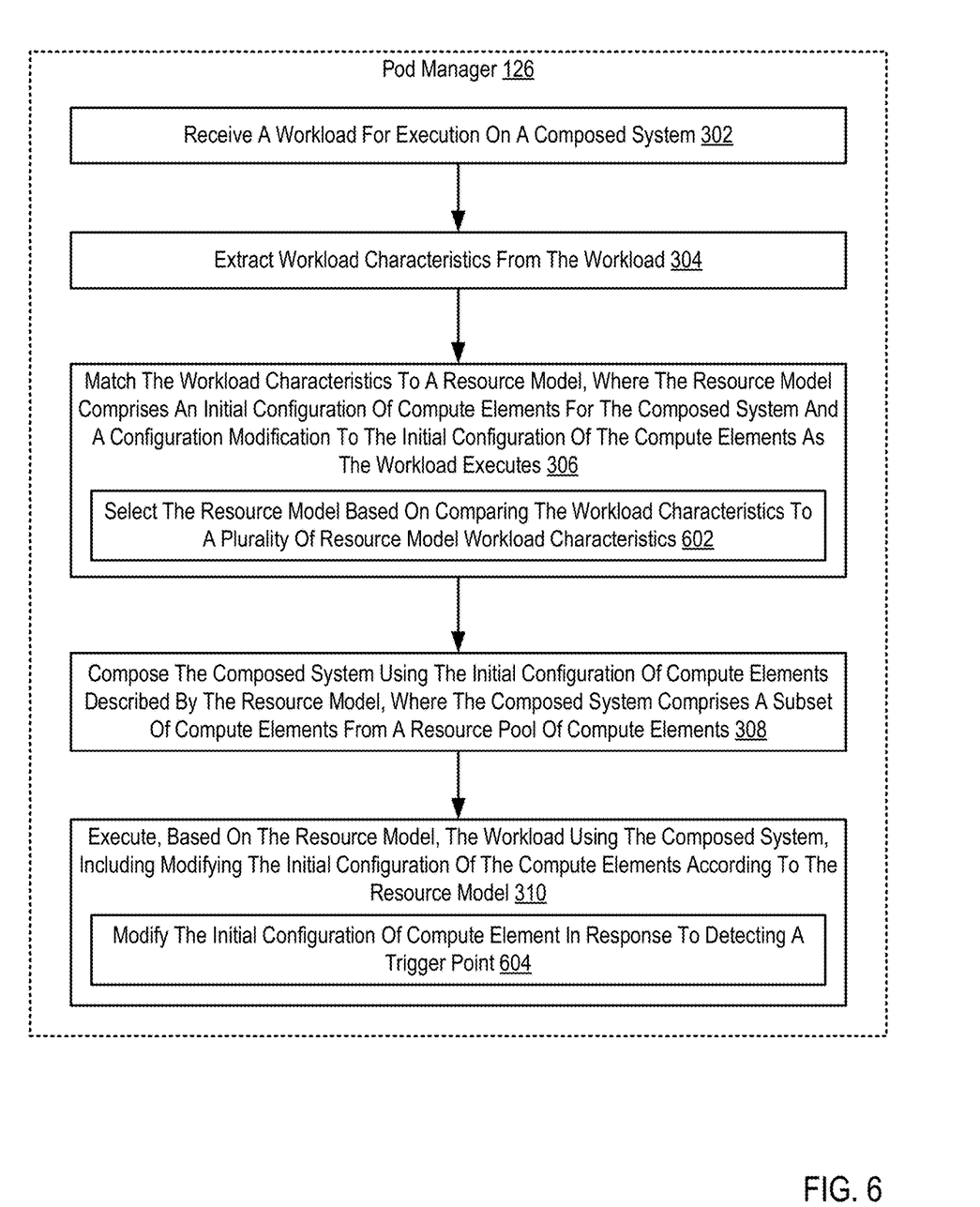
FIG. 6 sets forth a flow chart illustrating an exemplary method for modifying resources for composed systems based on resource models according to embodiments of the present invention.

For further explanation, FIG. 6 sets forth a flow chart illustrating a further exemplary method for modifying resources for composed systems based on resource models according to embodiments of the present invention that includes receiving (302) a workload for execution on a composed system; extracting (304) workload characteristics from the workload; matching (306) the workload characteristics to a resource model, wherein the resource model comprises an initial configuration of compute elements for the composed system and a configuration modification to the initial configuration of the compute elements as the workload executes; composing (308) the composed system using the initial configuration of compute elements described by the resource model, wherein the composed system comprises a subset of compute elements from a resource pool of compute elements; and executing (310), based on the resource model, the workload using the composed system, including modifying the initial configuration of the compute elements according to the resource model.

The method of FIG. 6 differs from the method of FIG. 3, however, in that matching (306) the workload characteristics to a resource model, wherein the resource model comprises an initial configuration of compute elements for the composed system and a configuration modification to the initial configuration of the compute elements as the workload executes includes selecting (602) the resource model based on comparing the workload characteristics to a plurality of resource model workload characteristics. Selecting (602) the resource model based on comparing the workload characteristics to a plurality of resource model workload characteristics may be carried out by selecting the resource model based on the relative similarities between the workload characteristics and the characteristics keyed to the resource model as compared to the characteristics keyed to other resource models. The pod manager (126) may select a resource model keyed to workload characteristics that is relatively similar to the characteristics of the received workload, as compared to other resource models in the resource model repository.

The method of FIG. 6 also differs from the method of FIG. 3, in that executing (310), based on the resource model, the workload using the composed system, including modifying the initial configuration of the compute elements according to the resource model includes modifying (604) the initial configuration of compute element in response to detecting a trigger point. Modifying (604) the initial configuration of compute element in response to detecting a trigger point may be carried out by detecting a trigger point described in the resource model and adding or removing compute elements based on instructions described in the resource model. For example, a resource model may describe an initial configuration of a processor and memory, and a trigger point of 90% utilization of the processor, at which time an accelerator is added. Each resource model may include multiple trigger points each indicating a different modification to the composed system. Trigger points may include, for example, utilization levels, percent of data processed, temperature of compute elements, and execution time elapsed.

In view of the explanations set forth above, readers will recognize that the benefits of modifying resources for composed systems based on resource models according to embodiments of the present invention include:

Improving the operation of a computing system by using machine learning to generate resource models to accurately anticipate the resources required to execute a workload, increasing computing system efficiency.

Improving the operation of a computing system by narrowly tailoring the compute resources required to execute workloads using tuned resource models, increasing computing system functionality.

Exemplary embodiments of the present invention are described largely in the context of a fully functional computer system for modifying resources for composed systems based on resource models. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method comprising:
by program instructions on a computing device,
receiving a workload for execution on a composed system;
extracting workload characteristics from the workload;
matching the workload characteristics to one of a plurality of resource models stored in a resource model repository, wherein the resource model comprises an initial configuration of compute elements for the composed system and a configuration modification to the initial configuration of the compute elements as the workload executes, wherein the resource model further comprises a trigger point indicating when, during the execution of the workload, the initial configuration of compute elements is to be modified;
composing the composed system from a subset of compute elements in a resource pool of compute elements, wherein the subset of compute elements satisfies requirements of the initial configuration of compute elements described by the resource model; and
executing, based on the resource model, the workload using the composed system, including modifying, during the execution of the workload and in response to detecting the trigger point, the initial configuration of the compute elements according to the configuration modification of the resource model.

2. The method of claim 1, further comprising:
generating a tuned resource model based on a comparison of the resource model to a monitored workload performance of the workload executing on the composed system.

3. The method of claim 1, wherein receiving the workload for execution on the composed system comprises receiving a workload application and workload data,
wherein extracting workload characteristics of the workload comprises extracting data characteristics from the workload data and extracting application characteristics from the workload application, and
wherein matching the characteristics to a resource model comprises matching the application characteristics and the data characteristics to the resource model.

4. The method of claim 1, wherein matching the workload characteristics to the resource model comprises selecting the resource model based on comparing the workload characteristics to a plurality of resource model workload characteristics.

5. The method of claim 1, wherein modifying the initial configuration of the compute elements according to the resource model comprises one selected from a group consisting of:
removing a communications link on an interconnect fabric between at least two of the subset of compute elements, and
adding a communications link on an interconnect fabric between an additional compute element and the subset of compute elements.

6. The method of claim 1, wherein the subset of compute elements comprises a hardware compute element and a software compute element.

7. An apparatus comprising a computing device, a computer processor, and a computer memory operatively coupled to the computer processor, the computer memory having disposed within it computer program instructions that, when executed by the computer processor, cause the apparatus to carry out the steps of:
receiving a workload for execution on a composed system;
extracting workload characteristics from the workload;
matching the workload characteristics to one of a plurality of resource models stored in a resource model repository, wherein the resource model comprises an initial configuration of compute elements for the composed system and a configuration modification to the initial configuration of the compute elements as the workload executes, wherein the resource model further comprises a trigger point indicating when, during the execution of the workload, the initial configuration of compute elements is to be modified;
composing the composed system from a subset of compute elements in a resource pool of compute elements, wherein the subset of compute elements satisfies requirements of the initial configuration of compute elements described by the resource model; and executing, based on the resource model, the workload using the composed system, including modifying, during the execution of the workload and in response to detecting the trigger point, the initial configuration of the compute elements according to the configuration modification of the resource model.

8. The apparatus of claim 7, wherein the computer program instructions further cause the apparatus to carry out the step of:
generating a tuned resource model based on a comparison of the resource model to a monitored workload performance of the workload executing on the composed system.

9. The apparatus of claim 7, wherein receiving the workload for execution on the composed system comprises receiving a workload application and workload data,
wherein extracting workload characteristics of the workload comprises extracting data characteristics from the workload data and extracting application characteristics from the workload application, and
wherein matching the characteristics to a resource model comprises matching the application characteristics and the data characteristics to the resource model.

10. The apparatus of claim 7, wherein matching the workload characteristics to the resource model comprises selecting the resource model based on comparing the workload characteristics to a plurality of resource model workload characteristics.

11. The apparatus of claim 7, wherein modifying the initial configuration of the compute elements according to the resource model comprises one selected from a group consisting of:
removing a communications link on an interconnect fabric between at least two of the subset of compute elements, and
adding a communications link on an interconnect fabric between an additional compute element and the subset of compute elements.

12. The apparatus of claim 7, wherein the subset of compute elements comprises a hardware compute element and a software compute element.

13. A computer program product including a non-volatile computer readable storage medium, the computer program product comprising computer program instructions that, when executed, cause a computer to carry out the steps of:
receiving a workload for execution on a composed system;
extracting workload characteristics from the workload;
matching the workload characteristics to one of a plurality of resource models stored in a resource model repository, wherein the resource model comprises an initial configuration of compute elements for the composed system and a configuration modification to the initial configuration of the compute elements as the workload executes, wherein the resource model further comprises a trigger point indicating when, during the execution of the workload, the initial configuration of compute elements is to be modified;
composing the composed system from a subset of compute elements in a resource pool of compute elements, wherein the subset of compute elements satisfies requirements of the initial configuration of compute elements described by the resource model; and
executing, based on the resource model, the workload using the composed system, including modifying, during the execution of the workload and in response to detecting the trigger point, the initial configuration of the compute elements according to the configuration modification of the resource model.

14. The computer program product of claim 13, wherein the computer program instructions further cause the computer to carry out the step of:
generating a tuned resource model based on a comparison of the resource model to a monitored workload performance of the workload executing on the composed system.

15. The computer program product of claim 13, wherein receiving the workload for execution on the composed system comprises receiving a workload application and workload data,
wherein extracting workload characteristics of the workload comprises extracting data characteristics from the workload data and extracting application characteristics from the workload application, and
wherein matching the characteristics to a resource model comprises matching the application characteristics and the data characteristics to the resource model.

16. The computer program product of claim 13, wherein matching the workload characteristics to the resource model comprises selecting the resource model based on comparing the workload characteristics to a plurality of resource model workload characteristics.

17. The computer program product of claim 13, wherein modifying the initial configuration of the compute elements according to the resource model comprises one selected from a group consisting of:
removing a communications link on an interconnect fabric between at least two of the subset of compute elements, and
adding a communications link on an interconnect fabric between an additional compute element and the subset of compute elements.

* * * * *